United States Patent [19]

Chapin

[11] Patent Number: 4,897,898
[45] Date of Patent: Feb. 6, 1990

[54] ADJUSTABLE TAPE MEASURE CLIP
[75] Inventor: David S. Chapin, Raleigh, N.C.
[73] Assignee: Cooper Industries, Inc., Houston, Tex.
[21] Appl. No.: 235,665
[22] Filed: Aug. 24, 1988
[51] Int. Cl.$^4$ .............................................. A45F 5/02
[52] U.S. Cl. ........................................ 24/3 J; 24/3 L
[58] Field of Search .............. 24/3 R, 3 L, 3 J, 11 R, 24/11 CT

[56] References Cited

U.S. PATENT DOCUMENTS

| D. 216,534 | 2/1970 | Zelnick et al. ..................... D52/1 |
| D. 289,742 | 5/1987 | Blakely et al. ..................... D10/72 |
| 1,102,922 | 7/1914 | Hoffman ........................... 24/11 R |
| 1,154,371 | 9/1915 | Burke ................................ 24/3 J |
| 1,692,712 | 11/1928 | Tannebaum ...................... 24/3 J |
| 1,702,283 | 2/1929 | Sunvold ............................ 24/3 L |
| 1,931,138 | 10/1933 | Staff ................................. 24/11 CT |
| 1,972,434 | 9/1934 | Yerk ................................. 24/3 J |
| 2,345,051 | 3/1944 | Jensen .............................. 24/3 J |
| 2,563,749 | 8/1951 | Rose et al. ........................ 24/3 L |
| 3,523,397 | 8/1970 | Carey et al. ...................... 53/30 |
| 4,111,343 | 9/1978 | Selinko ............................. 24/3 J |
| 4,190,955 | 3/1980 | Rushforth ........................ 24/3 R |
| 4,527,334 | 7/1988 | Jones et al. ...................... 33/138 |
| 4,536,925 | 8/1985 | Boothe et al. ................... 24/3 J |

FOREIGN PATENT DOCUMENTS

| 328535 | 10/1920 | Fed. Rep. of Germany ....... 24/3 R |
| 196681 | 4/1923 | United Kingdom ............. 24/11 CT |
| 769044 | 2/1957 | United Kingdom ................. 24/3 R |

Primary Examiner—Victor N. Sakran
Attorney, Agent, or Firm—David Alan Rose; Ned L. Conley; Donald J. Verplancken

[57] ABSTRACT

The adjustable tape measure clip includes a strip of spring steel folded over to form a primary spring with opposing leaves, the inner leaf being adapted for attachment to the case of the tape measure. The inner leaf includes a secondary spring for adjusting the spring force of the primary spring on the leaves of the clip. A mounting screw, which mounts the spring clip onto the case of the tape measure, also engages the secondary spring on the inner leaf to adjust the secondary spring force on the primary spring. As the screw is rotated, the secondary spring varies the primary spring force and thus adjusts the free clip width between the leaves to either increase or decrease the gripping pressure of the clip on the user's apparel.

6 Claims, 9 Drawing Sheets

ADJUSTABLE TAPE MEASURE CLIP

BACKGROUND OF THE INVENTION

This invention relates to the mounting of a tape measure to the user's apparel and, more particularly, to an adjustable mounting clip for a tape measure.

It is well known to use clips to releasably attach small tools, such as tape measures, to the user's apparel. Tape measures are commonly carried on the user's belt or clothing by means of a spring clip affixed to the tape measure.

The typical prior art mounting clip for a tape measure includes a strip of spring steel, typically one-half to one and one-half inches wide, which has been folded over into a U-shape to form inner and outer leaves. The fold or bend of the spring steel strip, together with the leaves, acts as a spring. The free end of the outer leaf is positioned to contact at a surface, i.e., the contact surface, on either the inner leaf or the side of the tape measure case. In many prior art devices, the outer leaf is longer than the inner leaf, and contacts the side of the tape measure case. The inner leaf of the clip is mounted to one side of the case of the tape measure and is often recessed into the side of the case to prevent the edge of the inner leaf from engaging the edge of the user's apparel as the clip receives the user's apparel. The outer leaf includes an access aperture to permit the passage and engagement of a screw which secures the inner leaf and, thus, the clip, to the case of the tape measure. The outer leaf includes a flared end to facilitate the placement of the clip over the user's apparel. The open end of the spring clip receives the edge of the user's apparel, such as a belt or the edge of the user's pockets or pants. As the spring clip receives the edge of the apparel, the inner and outer leaves are separated. The separation of the clip leaves creates spring tension at the fold of the clip and in the spring steel of the inner and outer leaves, causing the two leaves to grip the user's apparel. The curved portion of the clip and the spring steel of the leaves act as springs tending to force the outer leaf of the clip back into contact with the contact surface, due to the deformation of the leaves caused by the insertion of the user's apparel.

The contact pressure at the contact surface of the outer leaf is caused by effective over-energization of the fold of the clip. The fold of the clip acts as a spring, which tends to force the outer leaf into contact with the contact surface. If the fold was formed such that the inner and outer leaves were separated at rest, i.e., where no pressure or force is applied by the outer leaf to the contact surface, then the spring at the fold would be at equilibrium in the free state of the clip. However, because the clip is over-energized, i.e., the free state required for the spring to be at equilibrium would require the outer leaf to travel through the contact surface, the spring is constantly energized at the contact surface.

One of the principal disadvantages of the prior art clips is that the force, or contact pressure, which exists where the outer leaf contacts the contact surface, cannot be adjusted. Although it may be possible in certain prior art clips to bend the clip leaves so as to decrease this pressure, most clips are made from spring steels which prevent the easy bending of the clip so as to adjust the contact pressure. Where the contact pressure is too great, it is difficult for the user to slip the clip over the belt. On the other hand, if the contact pressure is inadequate, the clip will not adequately grip the belt, thus permitting the tape measure to fall off of the belt if the user, for example, were to bend over. Large adjustments of the contact pressure, which are facilitated by bending the clip outer leaf away from the inner leaf, will cause permanent deformation, thus leading to detrimental gripping performance and possible clip failure from metal fatigue. Further, it is extremely difficult to increase the contact pressure of a prior art clip, because the outer leaf cannot be effectively deformed inwardly toward the inner leaf by the clip user. Also, the repeated use of the clip tends to lead to fatigue, causing the spring pressure to lessen.

It is an object of the present invention to overcome the deficiencies of the prior art and provide an easily adjustable mounting clip. The present invention provides easy adjustment means to permit the user to adjust the tension of the mounting clip to meet the needs of the user.

Other objects and advantages will appear from the following description.

SUMMARY OF THE INVENTION

The adjustable tape measure clip of the present invention includes a strip of spring steel mounted on a tape measure case capable of adjusting the contact pressure of the outer leaf with the contact surface of the inner leaf or case. In the preferred embodiment, the adjustable tape measure clip includes a strip of spring steel folded over to form a primary spring of opposed inner and outer leaves formed by the folding action. The outer leaf meets at a contact surface on the case, where the spring force of the primary spring creates a contact pressure between the outer leaf and contact surface. The inner leaf is adapted for attachment to the case, and includes a secondary spring which adjusts the contact pressure between the outer leaf and contact surface by further energizing the primary spring. A mounting screw for mounting the spring clip to the case of the tape measure is employed to engage the secondary spring on the inner leaf. By tightening the screw, the primary spring is further energized, causing the force, or pressure, at the contact surface to increase thereby increasing the gripping pressure on the user's apparel. In alternative embodiments, the clip includes means for adjusting contact pressure without resort to a secondary spring on an inner leaf.

BRIEF DESCRIPTION OF THE DRAWINGS

For a detailed description of preferred embodiment of the invention, reference will now be made to the accompanying drawings wherein.

The invention may take form in various parts and arrangements of parts. The drawings are for purposes of illustrating preferred and alternative embodiments, and are not to be construed as limiting the invention.

DESCRIPTION OF THE PREFERRED EMBODIMENT

Figure 1:
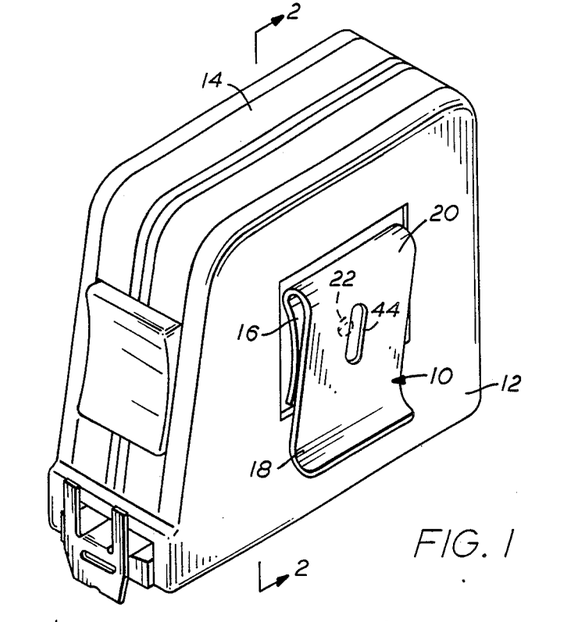
FIG. 1 is a perspective view of the adjustable mounting clip of the present invention.

Referring initially to FIG. 1, there is shown an adjustable mounting clip 10 affixed to one side of the case 12 of a tape measure 14. The clip 10 is made from a strip of spring steel which is typically one-half to one and one-half inches wide. The clip 10 is produced by folding over the strip of spring steel to form a generally U-shape. The U-shaped clip 10 includes an inner spring leaf 16, an outer spring leaf 18, and a semicircular portion 20 at the fold of the spring steel strip from which inner and outer leaves 16, 18 extend. The inner and outer leaves 16, 18 are not necessarily of the same width and length. Typically, inner leaf 16 is narrower and shorter than outer leaf 18. Semicircular portion 20, together with leaves 16, 18, create a primary spring means which produces a spring tension between inner and outer leaves 16, 18. When the clip 10 is placed over the user's apparel, such as a belt or pocket, the apparel is received between outer leaf 18 and inner leaf 16 and case 12.

Figure 2A:
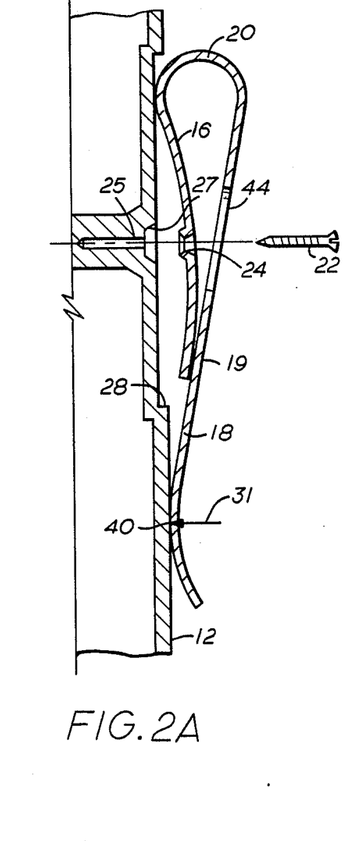
FIGS. 2A, B, and C are section views of the adjustable mounting clip at plane 2—2 of FIG. 1 with varying degrees of the adjustment of the mounting clip.
Figure 2B:
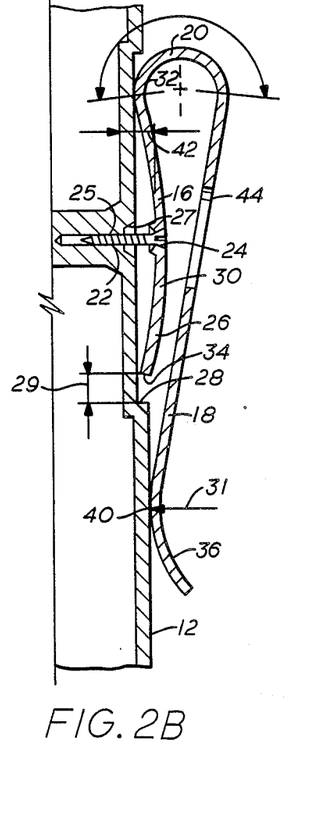

Referring now to FIGS. 2A, B and C, FIG. 2A illustrates the clip 10 prior to attachment to the case 12, where the inner and outer leaves 16, 18 merely touch at 19. In this position the spring tension between leaves 16, 18 is substantially zero. FIG. 2B shows the inner leaf 16 fastened to the side of the case 12 by means of a screw 22. Screw 22 is received through an aperture 24 in inner leaf 16 and threaded into hole 25. Screw 22 is preferably a self-tapping screw, so that hole 25 need not be pre-tapped for engagement of the screw 22 and accompanying clip 10. As best shown in FIG. 1, external leaf 18 includes an access aperture 44 to permit the insertion of a screwdriver to adjust screw 22. As best shown in FIG. 3, aperture 24 is beveled at 23 such that the head of screw 22 is substantially recessed within aperture 24 so as not to be an obstruction to the edge of the user's apparel as it is received within the clip 10. As best shown in FIG. 3, four equally spaced optional cut-outs forming tabs 33 are spaced around the beveled portion 23 of the aperture 24. The tabs 33 are bent out from the wall of the beveled portion 23 to act as a lockwasher to prevent the screw 22 from backing out of the hole 23. Although it is contemplated that the screw 25 will be held in place by the friction of the threads engaging the hole, tabs 33 may be included to provide an anti-rotation feature. The free end 36 of outer leaf 18 is flared to facilitate the placement of the clip onto the user's apparel.

A portion of inner leaf 16 is received within a recess 28 in the side of case 12. The recess 28 has sufficient depth to fully receive the free terminal end 26 of inner leaf 16 so as not to project away from the surface of case 12 and interfere with the reception of the wearer's apparel into the clip 10. Further, the recess 28 is longer than the inner leaf 16 to allow room, indicated by the numeral 29, for the inner leaf 16 to lengthen as it straightens due to the tightening of the screw 22. Recess 28 also includes a counterbore 27 to receive the beveled portion of leaf 16 forming aperture 24.

The free end 36 of outer leaf 18 applies a clip or contact pressure 31 against the contact surface 40 of the side of case 12. The inner leaf 16 is a half-elliptical spring or bow spring 30 which serves as the adjustment means for adjusting the clip pressure 31 of the clip 10. The apex of the bow of secondary spring 30 preferably occurs at the aperture 24 for screw 22. The bow of secondary spring 30 includes contact points at 32 and 34 whereby as screw 22 is tightened, the inner leaf 16 bears against the side of case 12 at contact points 32, 34 to increase the spring tension of the primary spring. The distance between the side of case 12 and the apex of the bow of secondary spring 30 is termed the bow distance 42. As screw 22 is tightened, as shown in FIG. 2C, the bow distance 42 is reduced and the inner leaf 16 is lengthened to reduce the room allowance 29 in recess 28.

Figure 2C:
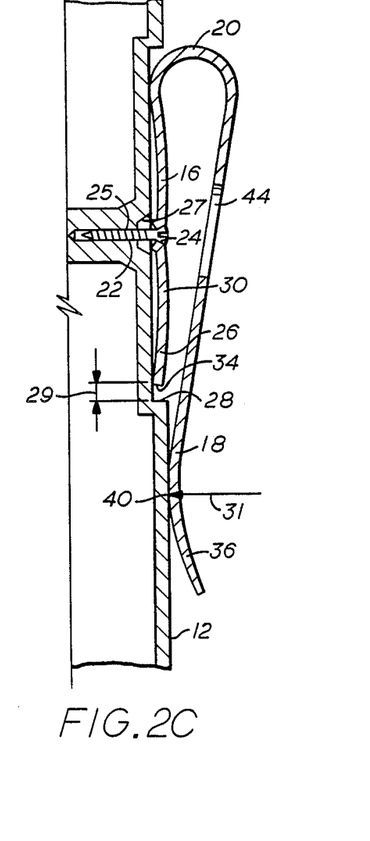
Figure 3:
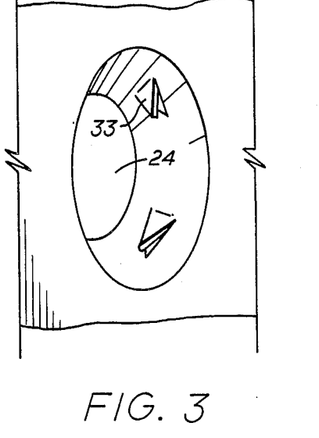
FIG. 3 is a partial enlarged view of the aperture for the screw of the mounting clip of FIG. 1.

As is shown in FIGS. 2A, 2B, and 2C, the contact pressure 31 increases as the screw 22 is tightened. As the screw 22 is tightened, the inner leaf 16 or secondary spring is energized causing the semicircular portion 20 to rotate thereby energizing the primary spring to force outer leaf 18 to move or rotate against the side of the case 12 at contact surface 40 to increase the gripping pressure or contact pressure 31. A small reduction in the bow distance 42 will increase the contact pressure 31 dramatically.

In operation, the user's apparel, such as the belt, is inserted between the outer leaf 18 and the side of case 12 through contact surface 40. The flared end 36 of outer leaf 18 facilitates the insertion of the user's apparel through contact surface 40. With the terminal end 26 of inner leaf 16 being received into the recess 28 of case 12, the insertion of the user's apparel between the leaves 16, 18 is not obstructed by any contact with the terminal end 26 of inner leaf 16. Should the user decide that the contact pressure at contact surface 40 be adjusted to either increase or decrease the grip force 31 of the clip 10 on the user's apparel, the user will first remove the belt and then insert a tool, such as a screwdriver, through access slot 44 to access the head of screw 22. The rotation of screw 22 by the lever action of the screwdriver will adjust the spring height or bow distance 42 of the half-elliptical spring 30. As half-elliptical spring 3 is activated by means of tightening or loosening screw 22 into the hole 25 of case 12, secondary spring 30 adjusts its spring force on the primary spring. As previously described, the contact pressure 31 at contact surface 40 is determined by the primary spring and the position of outer leaf 18 and inner leaf 16 in relation thereto. As screw 22 is adjusted to vary the spring height 42 of spring 30, the semicircular portion 20 is rotated causing the spring force on the primary spring to increase or decrease the gripping or mounting pressure 31 at contact surface 40. As spring height 42 decreases by the tightening of screw 22, the primary spring causes the contact pressure 31 to increase, thereby increasing the gripping force of the clip 10 on the user's apparel. As the spring height 42 is increased by the loosening of screw 22, the contact force 31 is decreased to loosen the grip force 31 of the clip 10 on the user's apparel.

Several different embodiments of the prevent invention are described in the following description. Throughout the remaining description and figures, wherever possible, like or similar numerals will refer to like or similar parts.

Figure 4:
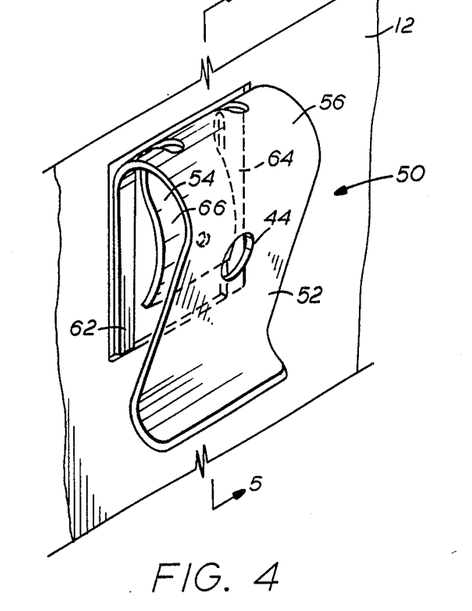
FIG. 4 is a partial perspective view of an alternative embodiment of the adjustable mounting clip of the present invention.
Figure 5:
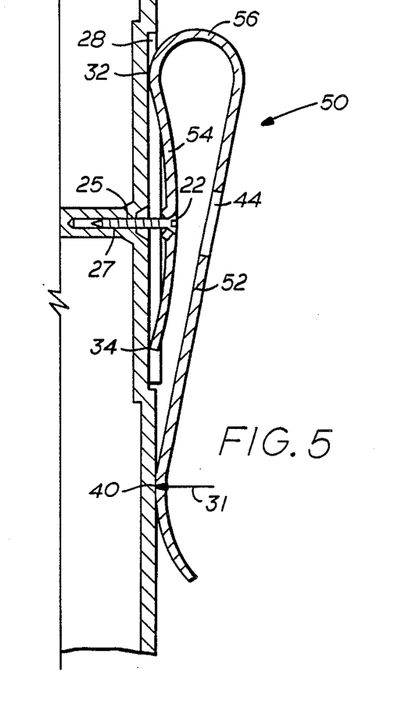
FIG. 5 is a section view of the adjustable mounting clip at plane 5—5 FIG. of 4.

Referring now to FIGS. 4 and 5 showing an alternative to the embodiment shown in FIG. 1, the alternative clip 50 includes a strip of spring steel folded over to form an outer leaf 52, an inner leaf 54, and a semicircular portion 56. As was the case of the preferred embodiment, the inner leaf 54 is received within a recess 28 in the side of case 12 and is affixed to the case 12 by a screw 22. As distinguished from the embodiment of FIG. 1, the inner leaf 54 includes parallel flats 62, 64 and a half-elliptical spring or bow spring 66 serving as a secondary spring. Half-elliptical spring 66 contacts the inner side of case 12 at contact points 32, 34. The clip 50 operates similarly to the preferred embodiment shown in FIG. 1 in that the threading of screw 22 in tapped hole 25 adjusts the spring force of secondary spring 66 causing the semicircular portion 56 to rotate thereby energizing the primary spring to force outer leaf 52 to move or rotate against the side of case 12 at contact surface 40 to adjust the gripping pressure or contact pressure 31. This embodiment permits the bow spring or secondary spring 66 to be sized to achieve a predetermined range of contact pressure 31. The parallel flats 62, 64 provide additional stability.

Figure 6:
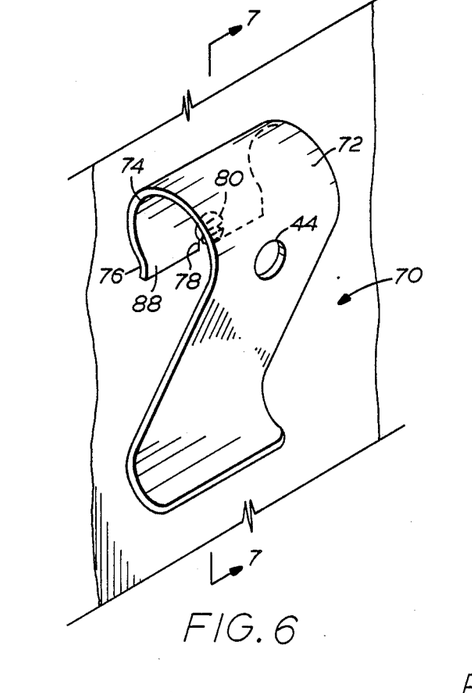
FIG. 6 is a partial perspective view of an alternative embodiment of adjustable mounting clip.
Figures 7, 8:
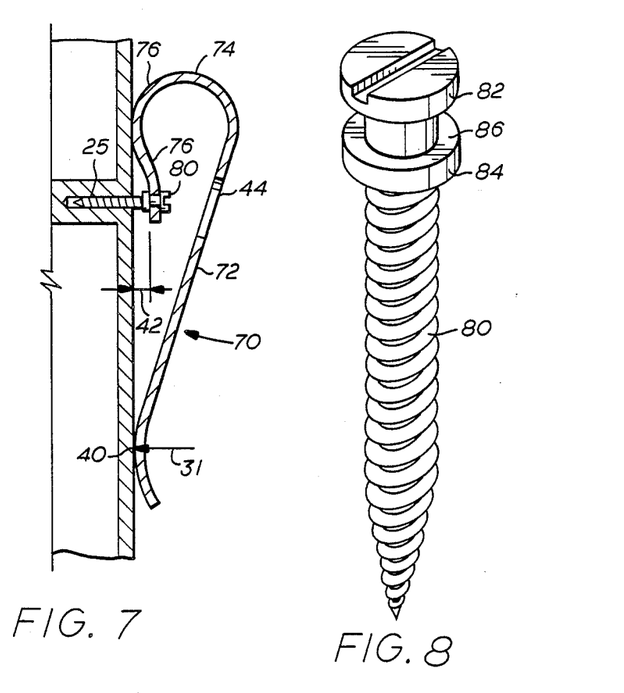
FIG. 7 is a section view of the mounting clip at plane 7—7 of FIG. 6.
FIG. 8 is a perspective view of the screw used with the adjustment means of the embodiment shown in FIG. 6.

Referring now to FIGS. 6, 7, and 8, there is shown another alternative to the embodiment shown in FIG. 1. The clip 70 includes a strip of spring steel folded over to form an outer leaf 72, a semicircular portion 74, and an inner leaf 76. The inner leaf 76 includes a U-shaped or semicircular slot 78 for receiving a double-headed screw 80. The double heads 82, 84 of screw 80 form an annular groove 86 having an inner diameter smaller than the diameter of the semicircular slot 78 and an outer diameter greater than the diameter of semicircular slot 78 whereby the free end 88 of inner leaf 76 is maintained between the heads 82, 84 as the screw 80 is threaded into the tapped hole 25 of the case 12. The clip 70 operates similarly to the preferred embodiment of FIG. 1 in that the threading of screw 80 into hole 25 of case 12 adjusts the spring force of inner leaf 76 by increasing or decreasing the distance 42. As distance 42 is reduced, the semicircular portion 74 is rotated to energize the primary spring forcing outer leaf 72 to move or rotate against the side of case 12 at contact surface 40 to adjust the gripping pressure or contact pressure 31. Although the inner leaf 76 is shown having a curvature, the inner leaf 76 could be straight if so desired.

The embodiments of the present invention shown in FIGS. 9–20, differ in operation from that described with respect to FIGS. 1–8. In the embodiments shown in FIGS. 1–8, the contact pressure adjustment means included an inner leaf and screw which, when the screw was tightened, causes the semicircular portion of the clip to rotate and increase the contact pressure 31 at the contact surface 40. The embodiments shown in FIGS. 9–20, however, include an adjustment means which applies a linear force on the clip spring to increase the load on the clip spring so as to increase the contact pressure 31 at the contact surface 40.

Figure 9:
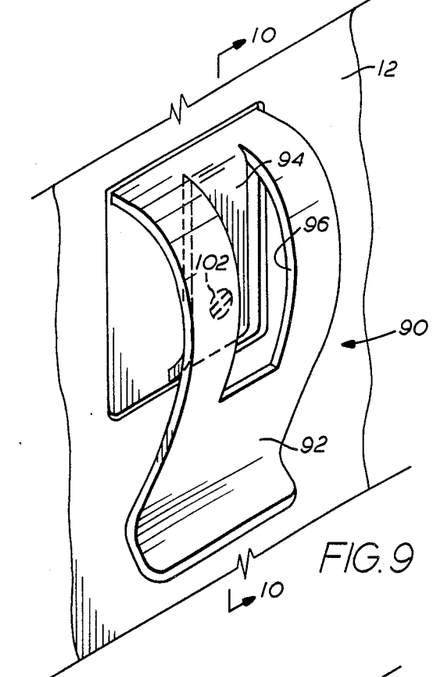
FIG. 9 is a partial perspective view of another alternative embodiment of the adjustable mounting clip of the present invention.
Figure 10:
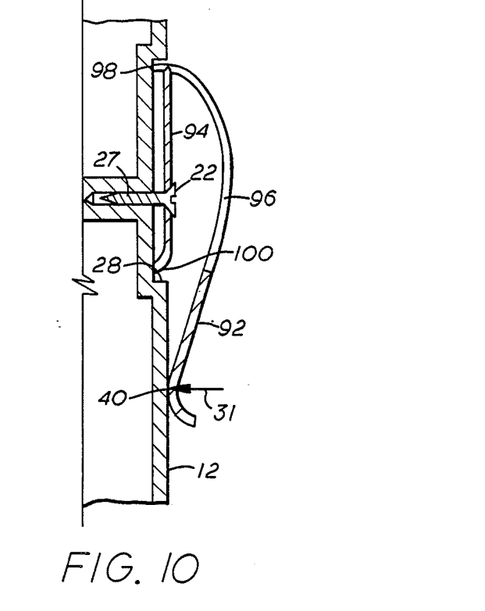
FIG. 10 is a section view of the adjustable mounting clip at plane 10—10 of FIG. 9.

Referring now to FIGS. 9 and 10, the clip 90 includes a generally S-shaped leaf spring 92 made of spring steel with a rectangular-shaped metal flat or lever 94 stamped from one end of the leaf spring 92 so as to leave an aperture 96. One end of the metal flat 90 is free while the other end forms a bend with the leaf spring 92. The leaf spring 92 contacts the side of the tape measure case 12 at contact point 98 and at contact surface 40. The metal flat 94 includes a rectangular-shaped leg 100 at its free end. It is preferred that the leg 100 is at an angle to the flat 94 to allow flat 94 to bend and to also allow a piece of apparel to pass over metal flat 94. The contact point 98 of leaf spring 92 and the leg 100 of metal flat 94 may be disposed in a recess 28 of case 12 if desired. By providing recess 28 in this embodiment, additional provision will be made to prevent the interference of the leg 100 with the insertion of a piece of apparel within the clip 90. A screw 22 is disposed through an aperture 102 in metal flat 94 for threaded engagement in the tapped hole 25 of case 12. Due to the extension of the metal flat 94 from one end of leaf spring 92 and the leg 100 at the other end, metal flat 94 is offset from the bottom of recess 28 at distance 42. Therefore, as the screw 22 is tightened within hole 25, an angular moment is created at the bend so as to increase the contact pressure 31 at contact surface 40.

Figure 11:
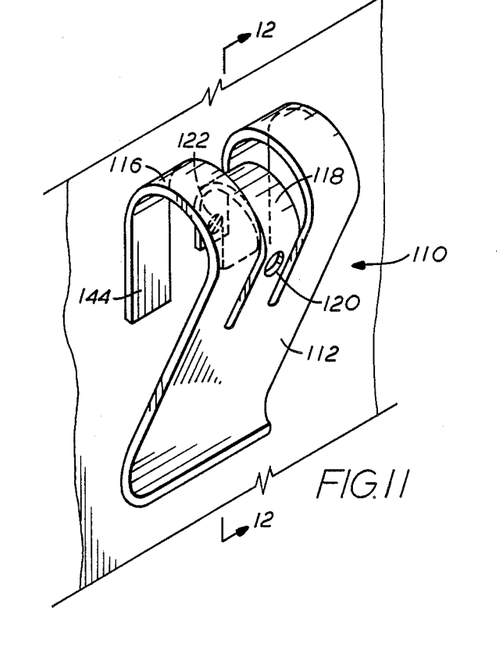
FIG. 11 is a partial perspective view of another alternative embodiment of the adjustable mounting clip of the present invention.
Figure 12:
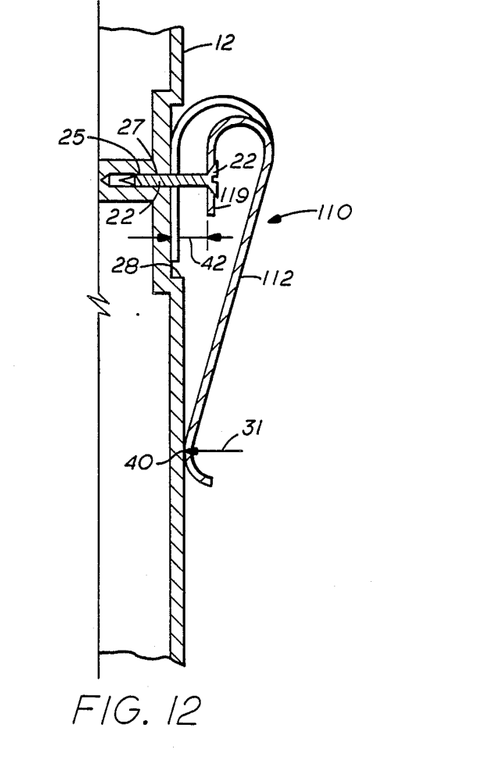
FIG. 12 is a section view of the adjustable mounting clip at plane 12—12 of FIG. 11.

Referring now to FIGS. 11 and 12, there is shown clip 110, another embodiment of the invention using linear rather than translational force for the adjustment of the tape measure clip. The clip 110 has been stamped from a continuous strip of spring steel from which has been formed an outer leaf 112, a pair of parallel inner leaves 104, semicircular portions 116 between outer leaf 112 and inner leaves 104, and a medial leaf 118 bent into a U-shape so as to form inner and outer flat portions 119, 121, respectively. The upper flat 121 includes a mounting aperture 120 for the passage of screw 22 which is then disposed within an aperture 22 in the lower flat 119 for threading engagement within tapped hole 25 of case 12. The pair of inner leaves 104 are received within the recess 28 of case 12. However, since the bend of medial leaf 118 has a smaller radius than the semicircular portion 116 of inner and outer leaves 112, 104, the inner flat 119 of medial leaf 118 is disposed above the bottom of recess 28 a distance 42. As the screw 22 is tightened within the hole 25, the distance 42 between the medial leaf and the bottom of recess 28 is reduced thereby applying a linear force to the outer leaf 112 so as to increase the contact pressure 31 at the contact surface 40. Likewise, loosening the screw 22 reduces the contact pressure 31.

Figure 13:
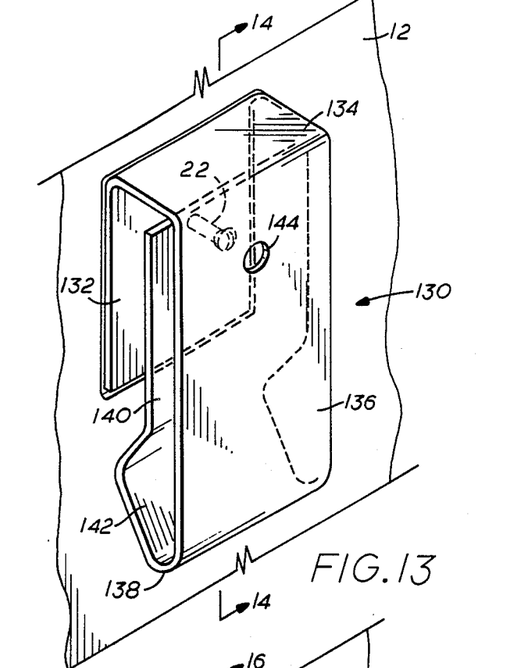
FIG. 13 is a partial perspective view of another alternative embodiment of the adjustable mounting clip of the present invention.
Figure 14:
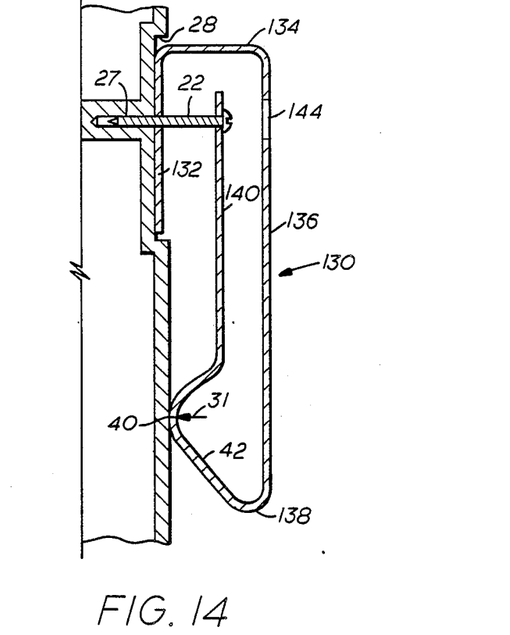
FIG. 14 is a section view of the mounting clip at plane 14—14 of FIG. 13.

Referring now to FIGS. 13 and 14, clip 130 is a continuous strip of spring steel with an inner leaf 132 bent to form a semicircular portion 134 which extends to outer leaf 136. The inner leaf 132 is received within the recess 28 of the case 12. Outer leaf 136 is bent under at 138 to form a medial leaf 140. Medial leaf 140 includes a protruding bent portion which forms a shoe 142 for engagement with contact surface 40 of the case 12. The medial leaf 140 includes an aperture 141 adjacent its free end for alignment with an aperture 143 in inner leaf 132 through which is disposed screw 22 for threading engagement with the tapped hole 25 of case 12. An access hole 144 is provided in the outer leaf 136 to allow access to the screw 22. To increase the contact pressure 31 at contact surface 40 by the shoe 142, screw 22 is threaded into hole 27 of case 12. As medial leaf 140 moves toward the case 12 and the distance between the bottom of recess 28 and medial leaf 40 is reduced, the medial leaf 140 and outer leaf 136 move inwardly by a direct, linear motion, as opposed to a translational motion of the embodiment of FIG. 1.

Figure 15:
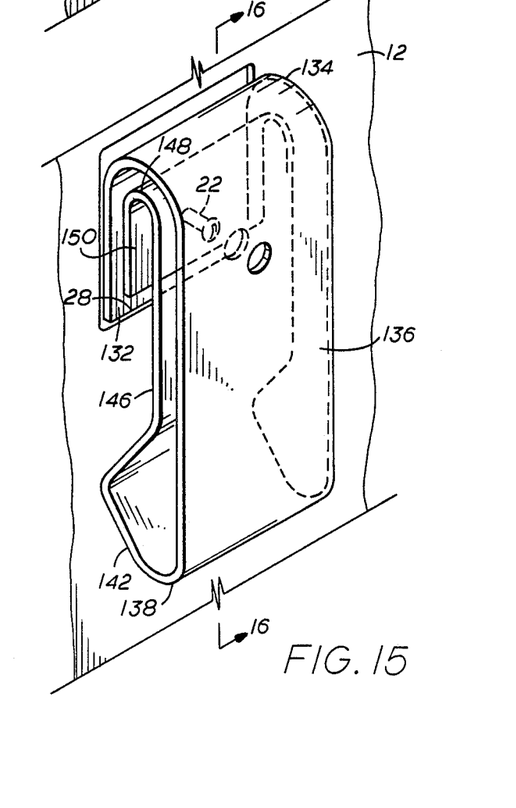
FIG. 15 is a partial perspective view of another alternative embodiment of the adjustable mounting clip of the present invention.
Figure 16:
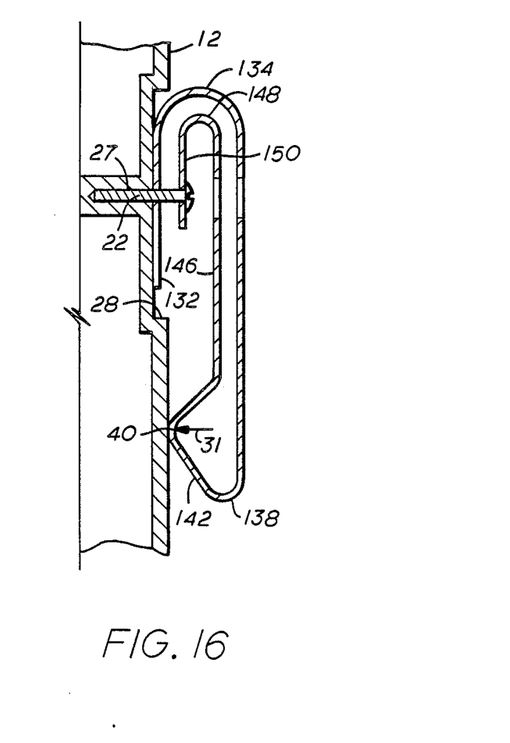
FIG. 16 is a section view of the adjustable mounting clip at plane 16—16 of FIG. 15.

Other alternative embodiments may be employed to increase and decrease the contact pressure 31 by linear, as opposed to translational, motion or force without deviating from the scope of the invention. FIGS. 15 and 16 illustrate a modification of the embodiment of FIGS. 13 and 14. In this embodiment, the medial leaf 146 includes a folded free end forming a semicircular portion 148 and an interior leaf 150. Coaxial apertures are provided in outer leaf 136, medial leaf 146, interior leaf 150, and inner leaf 132 whereby screw 22 will pass through the apertures of outer leaf 136 and medial leaf 146 for disposal within the apertures of interior leaf 150 and inner leaf 132 for threaded engagement within the hole 25 of case 12.

Figure 17:
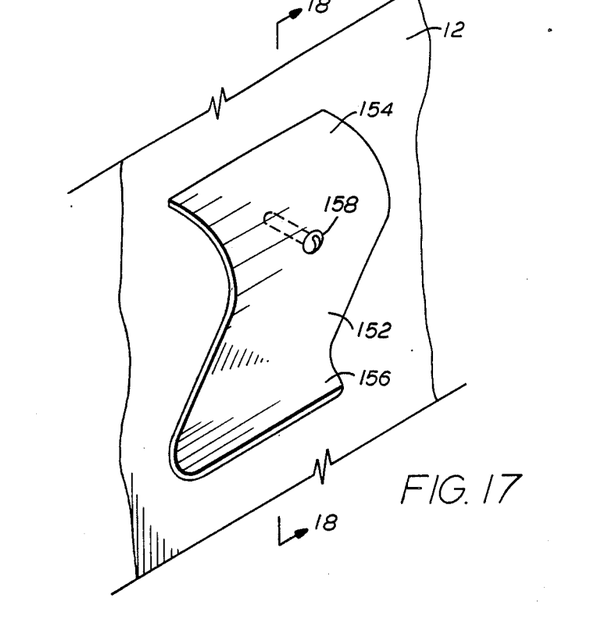
FIG. 17 is a partial perspective view of another alternative embodiment of the adjustable mounting clip of the present invention.
Figure 18:
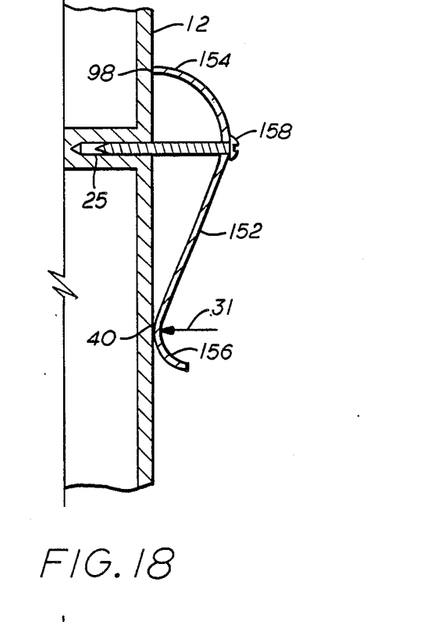
FIG. 18 is a section view of the adjustable mounting clip at plane 18—18 of FIG. 17.

FIGS. 17-20 illustrate two embodiments whereby the linear force is applied directly to the outer leaf. Referring now to FIGS. 17 and 18, there is shown a clip 152 in the form of an S-shaped, continuous strip of spring steel. One end 154 contacts the case 12 at 98 and the flared end 156 contacts the case at contact surface 40. An aperture 158 is provided in the leaf 152 through which is disposed screw 22 for threaded engagement within tapped hole 25 of case 12. As the screw 22 is threaded into the hole 25, a linear force is applied to the leaf 152 and causes the leaf 152 to bear against the case at contact line 98 and contact surface 40. As the screw is tightened, the contact force 31 at surface 40 is increased.

Figure 19:
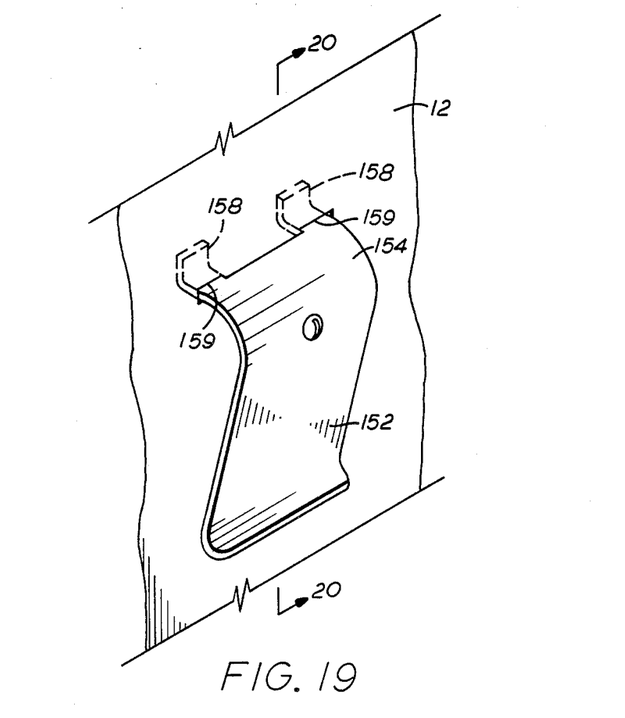
FIG. 19 is a partial perspective view of another alternative embodiment of the adjustable mounting clip of the present invention.
Figure 20:
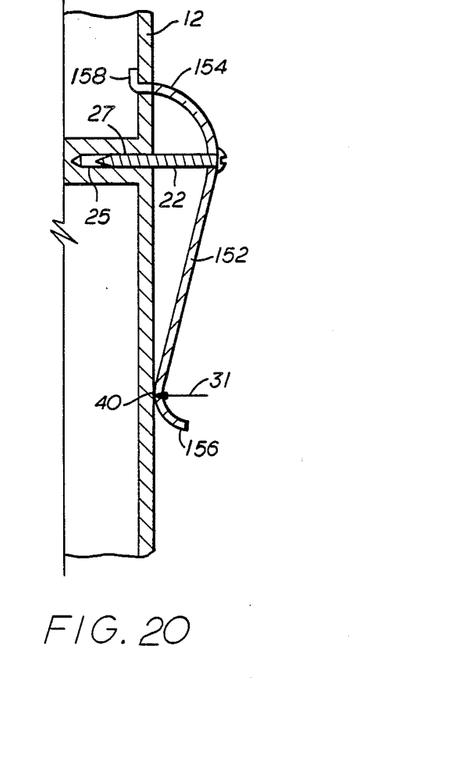
FIG. 20 is a section view of the adjustable mounting clip at plane 20—20 of FIG. 19.

Referring now to FIGS. 19 and 20, there is shown a modification of the embodiment of FIGS. 17 and 18 wherein the end 154 of leaf 152 includes means for anchoring the end 154 within the case 12. The anchoring means includes a pair of bent ears 158 passing through apertures 159 in the side of the case 12 whereby the ears 158 hook underneath and bear against the inside of the case 12 to appropriately anchor the end 154 of the leaf 152.

Other embodiments of the present invention may be used to adjust the contact pressure 31 of the clip 10 against the case 12.

Figure 21:
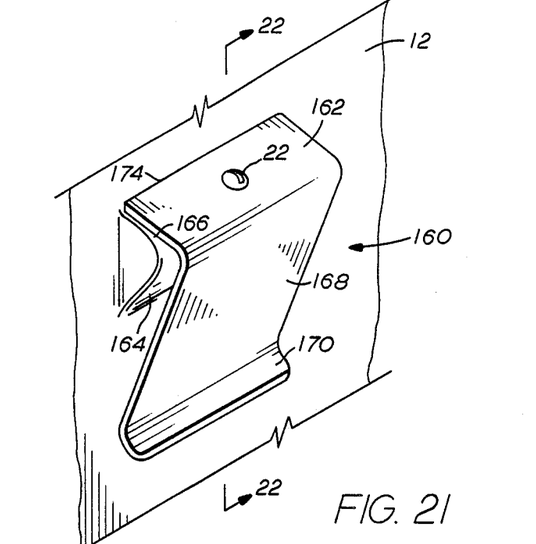
FIG. 21 is a partial perspective view of another alternative embodiment of the adjustable mounting clip of the present invention.
Figure 22:
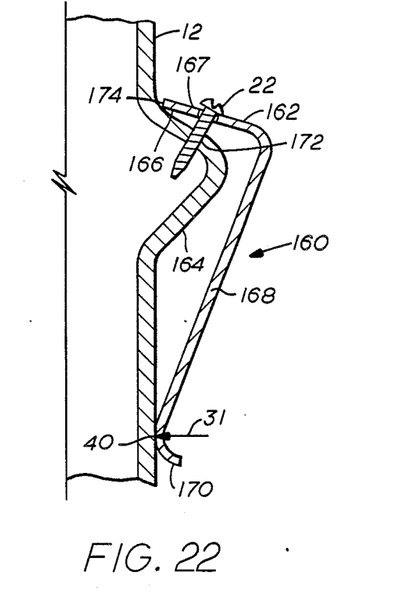
FIG. 22 is a section view of the adjustable mounting clip at plane 22—22 of FIG. 21.

Referring now to FIGS. 21 and 22, the clip 160 is a generally L-shaped, continuous strip of spring steel with one leg 162 mounted over a ledge 164 protruding from the side of the case 12. The ledge 164 preferably is V-shaped and a part of the side of the case 12 forming a support surface 166. The support surface 166 is angled obliquely from the side of the case 12 so as to form an oblique angle therewith. The longer leg 168 of clip 160 includes a flared end 170 engaging contact surface 40 of case 12. The short leg 162 is fastened to the support surface 166 by a screw 22 extending through an aperture 167 in the short leg 162 for threading engagement in a tapped hole 172 in ledge 164. The forward edge 174 of shorter leg 162 bears against the side of the case 12. The oblique angle formed between the shorter leg 162 and case 12 is smaller than the oblique angle formed by support surface 166 and the side of the case 12 such that there is a gap or distance between the shorter leg 162 and support 166. As the screw 22 is tightened into hole 172 of ledge 164, a lever action is created between the bearing edge 174, screw 22, and the contact surface 40 whereby the flared end 170 of longer leg 168 bears against the side of the case 12. The tightening of the screw 22 thereby increases the contact force 31 of the longer leg 168 against contact surface 40. Likewise, as screw 22 is retracted from the tapped hole 172, the contact force 31 is decreased.

Figure 23:
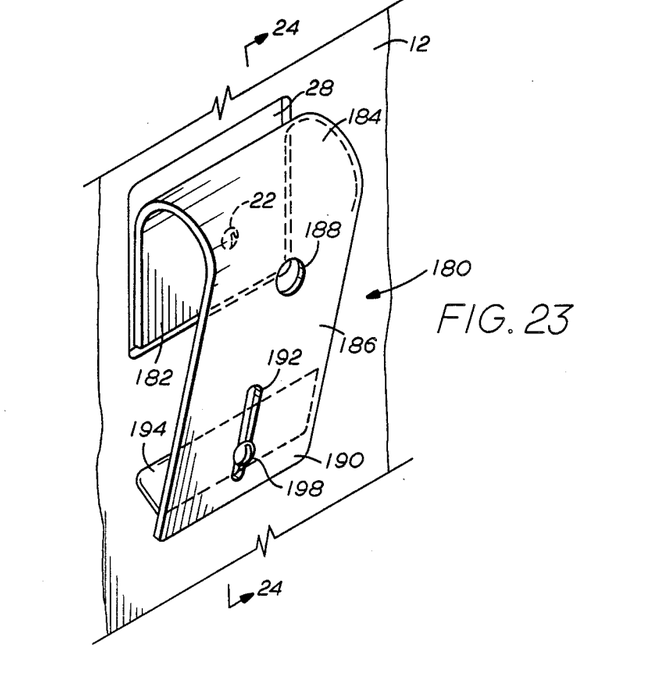
FIG. 23 is a partial perspective view of another alternative embodiment of the adjustable mounting clip of the present invention.
Figure 24:
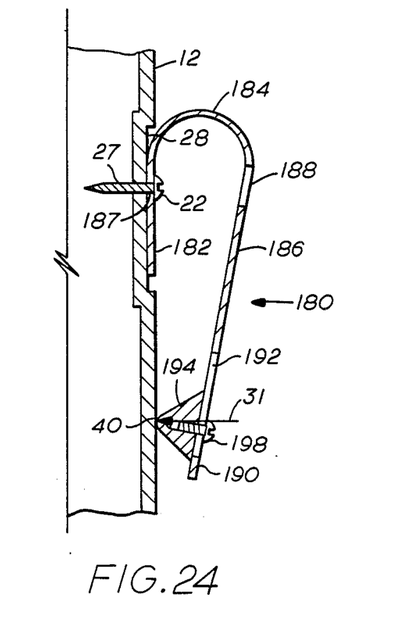
FIG. 24 is a section view of the adjustable mounting clip at plane 24—24 of FIG. 23.

Referring now to FIGS. 23 and 24, there is shown a clip 180 made of a continuous strip of spring steel. The clip 180 is U-shaped forming an inner leaf 182, semicircular portion 184, and outer leaf 186. The inner leaf 182 is received within recess 28 of case 12 and is attached to the side of case 12 by means of a screw 22 extending through an aperture 187 in inner leaf 182 and threadingly engaged with the tapped hole 25 in case 12. An access aperture 188 is provided in outer leaf 186 to permit the insertion of a screwdriver to obtain access to screw 22. As distinguished from previous embodiments, the free end 190 of outer leaf 186 does not engage and contact the side of case 12. An elongated slot 192 is provided adjacent the free end 190 of outer leaf 186 for the attachment of an adjustment shoe 194. Shoe 194 includes a tapped hole 196 for threadingly engaging a screw 198 passing through the slot 192. The slot 192 is parallel to the longitudinal axis of outer leaf 186. The shoe 194 is sized so as to bridge the gap between the contact surface 40 and the free end 190. With the shoe 194 mounted in the uppermost portion of the slot 192, the contact force 31 is at its minimum. As the shoe is moved down the slot 192, the shoe biases the outer leaf 186 away from the side of the case 12 to increase the contact pressure 31 at the contact surface 40. Thus, by adjusting the shoe within slot 192, the user may increase or decrease the contact force 31.

Figure 25:
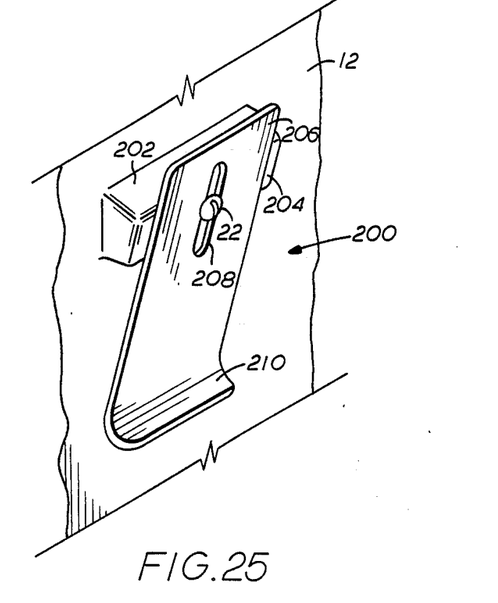
FIG. 25 is a partial perspective view of another alternative embodiment of the adjustable mounting clip of the present invention.
Figure 26:
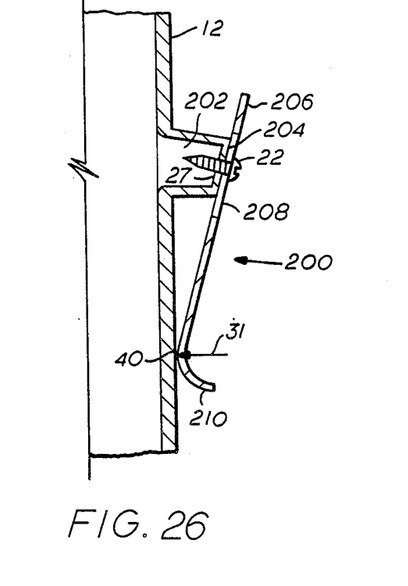
FIG. 26 is a section view of the adjustable mounting clip at plane 26—26 of FIG. 25.

Referring now to FIGS. 25 and 26, a variation of the embodiment of FIGS. 23 and 24 is shown. The clip 200 replaces the shoe of the embodiment of FIGS. 23 and 24 with a raised support 202 projecting from the side of the case 12. The support 202 includes an inclined ledge 204 for engagement with the clip 200. The clip 200 includes a generally J-shaped strip of spring steel. The end 206 of clip 200 includes a longitudinal slot 208 having an axis generally parallel with the axis of the clip 200. A screw 22 passes through the slot 208 and is threadedly engaged in a tapped hole 172 within the support 202 of case 12. The ledge 204 is at an angle with the surface of the case 12 such that upon attachment of the clip 200 to the support 202, the flared end 210 of the clip 200 engages the side of case at contact surface 40. To adjust the contact pressure 31 at the contact surface 40, the clip 200 is adjusted within the slot 208 and screw 22 connection. By lengthening the distance between the screw 22 and the point of engagement at contact surface 40, the contact pressure 31 is increased. Thus, the contact pressure 31 of clip 200 may be adjusted.

FIGS. 27–30 illustrate a slightly different embodiment from those previously described. The previous embodiments, with the exception of those shown in FIGS. 23–26, used the tightening of the screw 22 to increase the contact pressure 31 at the contact surface 40. The embodiments of FIGS. 27–30 loosen the screw to increase the contact pressure 31.

Figure 27:
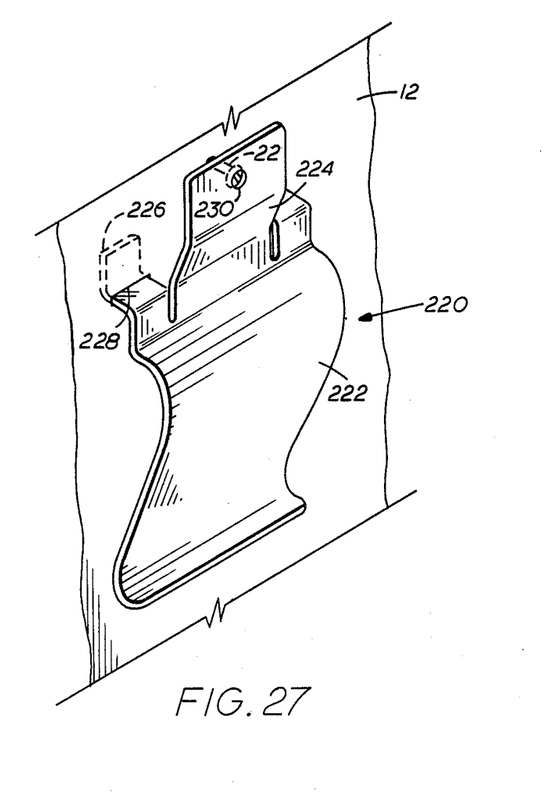
FIG. 27 is a partial perspective view of another alternative embodiment of the adjustable mounting clip of the present invention.
Figure 28:
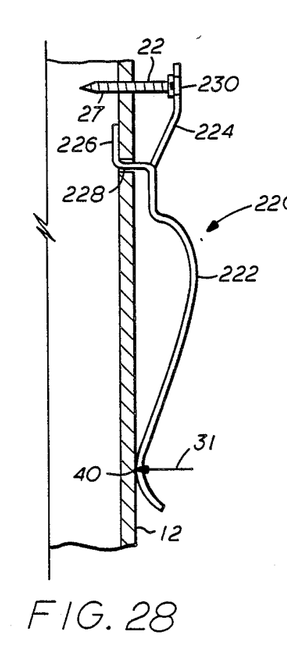
FIG. 28 is a section view of the adjustable mounting clip at plane 28—28 of FIG. 27.

Referring now to FIGS. 27 and 28, there is shown clip 220 wherein a lever action is employed to adjust the clip contact pressure 31. The clip 220 includes a continuous strip of spring steel stamped to form a generally S-shaped leaf 222, a bearing flat 224, and a pair of anchor tangs 226. The anchor tangs 226 are generally L-shaped, extending perpendicular to and on each side of bearing flat 224. The case 12 includes a pair of recesses 228 for receiving anchor tangs 226. A screw 22 is threadingly engaged in the tapped hole 25 of the case 12 with its head disposed beneath the bearing flat 224. The bearing flat 224 includes an adjustment aperture 230 which is sized to permit the passage of a screwdriver for turning screw 22 but diametrically smaller than the head of screw 22. To increase the contact pressure 31 at contact surface 40, the screw 22 is rotated out of the threaded hole 25 such that the head of screw 22 bears upon the underside of the lip of adjustment aperture 230. As the screw 22 moves away from the side of the case 12, the screw 22 forces the bearing flat 224 away from the side of the case 12. This causes a lever action due to the anchoring of the anchor tangs 226 against the underside of the case 12 thereby increasing the spring pressure of leaf 222 and increasing the contact pressure 31 at contact surface 40.

Figure 29:
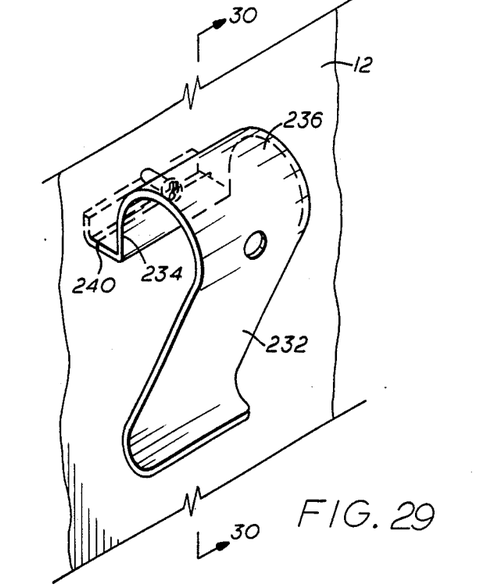
FIG. 29 is a partial perspective view of an alternative embodiment of the adjustable mounting clip of the present invention.
Figure 30:
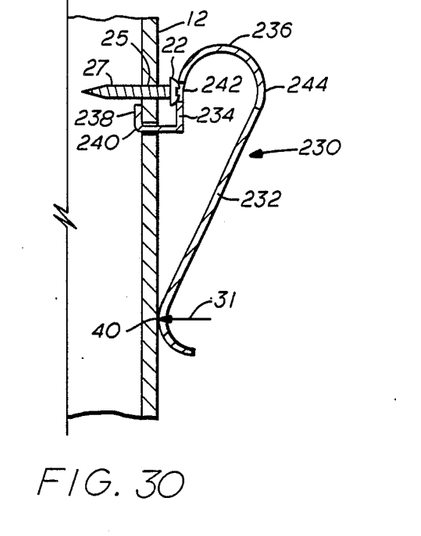
FIG. 30 is a section view of the adjustable mounting clip at plane 30—30 of FIG. 29.

Referring now to FIGS. 29 and 30 showing an alternate to the embodiment of FIGS. 27 and 28. FIGS. 29 and 30 illustrate a clip 230 made of a continuous strip of spring steel. The clip 230 includes an outer leaf 232 joining an inner leaf 234 by a semicircular portion 236. An anchor tang 238 is formed on the end of inner leaf 234. The anchor tang 238 is received within an aperture 240 in the side of the case 12. The anchor tang 238 is generally L-shaped in cross-section whereby the free end is generally parallel to the underside of the case so as to bear against the underside of the case 12 as hereinafter described. A screw 22 is threadedly engaged to a tapped hole 25 in the side of the case 12 with the head of the screw 22 being positioned beneath inner leaf 234. Inner leaf 234 includes an aperture 242 sized to receive the head of a screwdriver for engagement with screw 22 but diametrically smaller than the head of the screw 22 to prevent the screwhead from passing through the aperture 242. The outer leaf 232 includes an access aperture 244 to permit access to the head of the screw 22 by the screwdriver. As described with respect to FIGS. 27 and 28, to increase the contact pressure 31 at contact surface 40, the screw 22 is rotated away from the side of the case 12 such that the head of the screw 22 bears upon the lip of the aperture 242. This force on the inner leaf 234 causes the clip 230 to rotate whereupon the anchor tangs 238 engage the underside of the case 12, and the contact pressure 31 is increased at the contact surface 40.

FIGS. 31–34 illustrate a different embodiment of the present invention whereby the clip is rotated about an arcuate surface on the side of the case 12 to adjust contact pressure 31.

Figure 31:
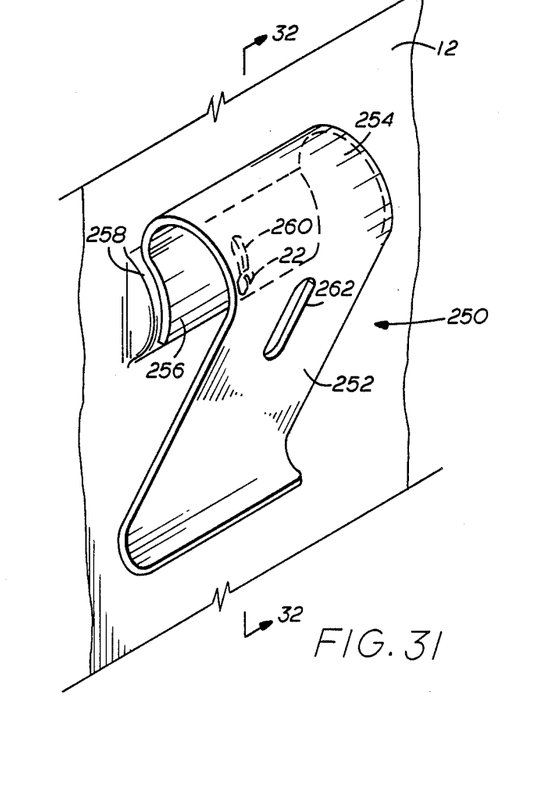
FIG. 31 is a partial perspective view of another alternative embodiment of the adjustable mounting clip of the present invention.
Figure 32:
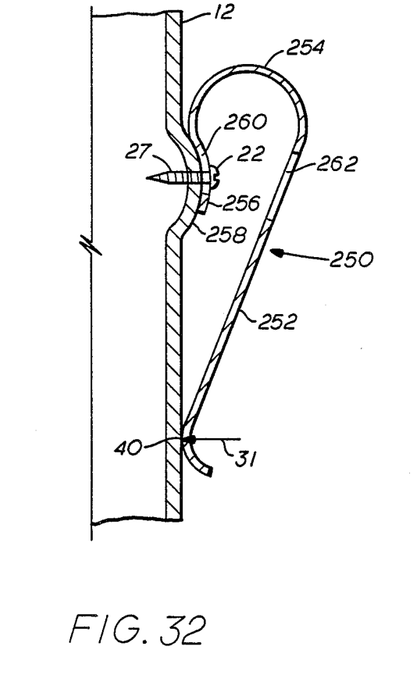
FIG. 32 is a section view of the adjustable mounting clip at plane 32—32 of FIG. 31.

Referring now to FIGS. 31 and 32, there is shown a clip 250 whereby the entire clip 250 may be moved relative to the case 12 to adjust the contact pressure 31. The clip 250 includes a continuous strip of spring steel forming a leaf 252, semicircular portion 254, and inner arcuate leaf 256. The case 12 includes a mount 258 which is an arcuate protrusion from the side of the case 12. The mount 258 is preferably an integral part of the case 12. However, an arcuate member made of metal, plastic, or other material may be attached to the side of the case 12 to form the mount 258. An elongated slot 260 has been formed in arcuate leaf 256 with the slot 260 being generally parallel to the longitudinal axis of the clip 250. A screw 22 is disposed through slot 260 and threadedly engaged in a tapped hole 172 extending through the mount 258. An access aperture 262 is provided in outer leaf 252 to provide screwdriver access to the screw 22. The tapped hole 172 is disposed on the apex of the arcuate mount 258. The curvature of the mount and the curvature of the arcuate leaf 256 are substantially the same so as to be slidingly engageable. The outer leaf 252 has been formed with a curvature such that upon positioning the screw 22 in the lowermost end of longitudinal slot 260, the contact pressure 31 on contact surface 40 is at a minimum. By sliding the slot 260 downward over screw 22, the clip 250 is rotated against the side of case 12 such that the contact pressure 31 is increased at contact surface 40.

Figure 33:
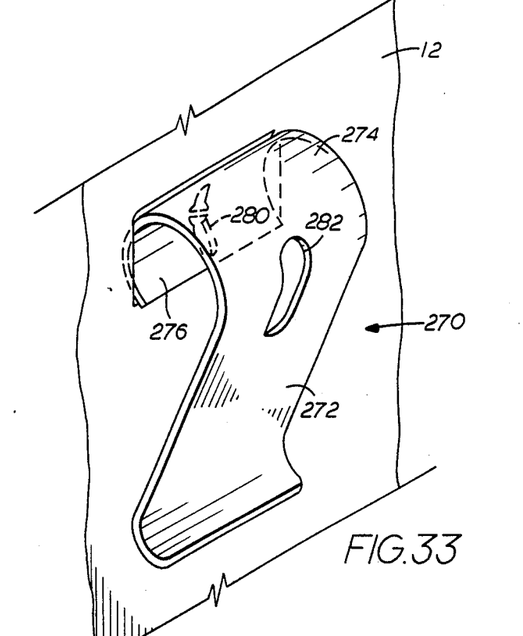
FIG. 33 is a partial perspective view of another alternative embodiment of the adjustable mounting clip of the present invention.
Figure 34:
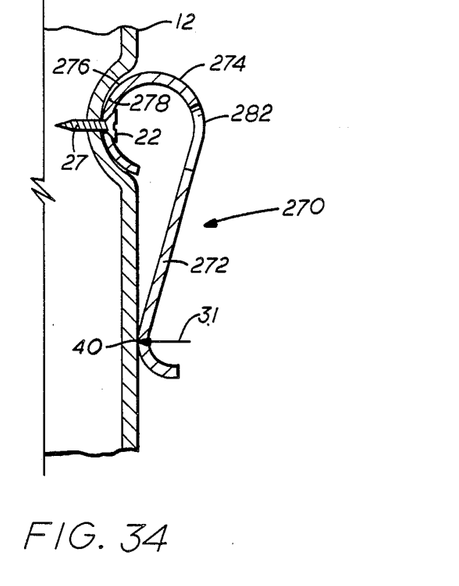
FIG. 34 is a section view of the adjustable mounting clip at plane 34—34 of FIG. 33.

Referring now to FIGS. 33 and 34, an alternative mount is disclosed. The clip 270 includes an outer leaf 272, semicircular portion 274 with the semicircular portion 274 forming an arcuate segment 276. The case 12 includes a concave recess 278 having a radius conforming to the radius of arcuate leaf 276 whereby arcuate segment 276 is received within concave recess 278. An elongated slot 280 is provided in arcuate leaf 276 with the longitudinal axis of slot 280 being generally parallel to the axis of clip 270. A screw 22 is disposed through slot 280 for threaded engagement in tapped hole 172 in the bottom of recess 278. An access aperture 282 is provided in outer leaf 272 to permit access by a screwdriver to the screw 22. As distinguished from the embodiment of FIGS. 31 and 32, the contact pressure 31 at contact surface 40 is at a minimum when the screw 22 is positioned at the uppermost end of elongated slot 280. Upon sliding the slot 280 upward over screw 22 by rotation of arcuate segment 276, the clip 270 is rotated to increase the contact pressure 31 at contact surface 40.

Figure 35:
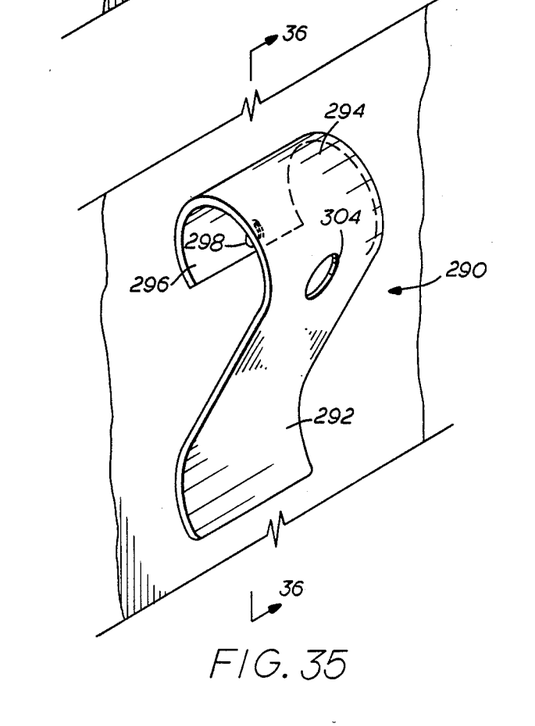
FIG. 35 is a partial perspective view of another alternative embodiment of the adjustable mounting clip of the present invention.
Figure 36:
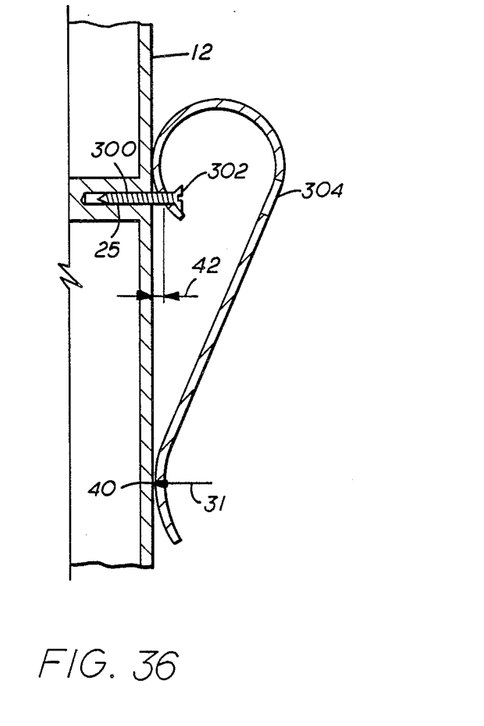
FIG. 36 is a section view of the adjustable mounting clip at plane 36—36 of FIG. 35.

Referring now to FIGS. 35 and 36, there is shown another alternative to the embodiment shown in FIG. 1. The clip 290 includes a strip of spring steel folded over to form an outer leaf 292, a semicircular portion 294 and an inner leaf 296. Inner leaf 296 includes an aperture 298 for receiving a screw 300 therethrough. The aperture 298 is countersunk, so that countersink screw head 302 fits therein to permit insertion of a belt or piece of clothing without interference with screw 300. Outer leaf 292 includes access aperture 304 which is colinear with aperture 298 and is diametrically larger than screw head 302 to permit screw 300 to pass through access aperture 304 into aperture 298. The clip 290 operates similarly to the preferred embodiment of FIG. 1 in that the threading of screw 30 into hole 25 of case 12 adjusts the spring of force of inner leaf 296 by increasing or decreasing the distance 42. As distance 42 is reduced, the semicircular portion 294 is rotated to energize the primary spring forcing outer leaf 292 to move or rotate against the side of case 12 at contact surface 40 to adjust the gripping pressure or contact pressure 31. Although the inner leaf 296 is shown having a curvature, the inner leaf 296 could be straight if so desired.

While preferred and alternative embodiments of the invention have been shown and described, modifications thereof can be made by one skilled in the art without departing from the spirit of the invention.

I claim:

1. A clip for mounting a tool onto the user's apparel, comprising:
    a spring of a continuous length of metal including a first length for mounting said spring to the tool, a third length for gripping the user's apparel, and a second length between said first and third lengths for elastically attaching said first length to said third length; connecting said first and third lengths;
    said first length being disposed opposite said third length by said second length;
    said third length in contact with said first length and pressing upon said first length with a contact pressure; and
    said first length further having an excitation means for applying a force to said second length to adjust said contact pressure.

2. The clip of claim 1, wherein said excitation means is a half-elliptical spring in said first length.

3. The clip of claim 1, wherein said excitation means includes adjustment means adapted for connection to the tool for applying a predetermined force on said excitation means to adjust said contact pressure.

4. The clip of claim 1, wherein said excitation means is a contoured portion of said first length to slidingly engage a protrusion from the tool.

5. The clip of claim 1, wherein said first length is contoured to slidingly engage a recess in the tool.

6. A clip for attaching a tool to a wearer's apparel, comprising:
    a generally U-shaped spring including a mounting end and a gripping end;
    said mounting end being attached to the tool;
    said gripping end being in contact with the tool and having a mounting slot therein;
    a sliding adjustment plate disposed adjacent the terminus of said gripping end;
    an adjustment screw extending through said slot and attached to said plate whereby said screw is slidingly received within said mounting slot; and
    said plate being adjusted between said bearing end and the tool for modifying the force under which said gripping end contacts the tool.

* * * * *

UNITED STATES PATENT AND TRADEMARK OFFICE
CERTIFICATE OF CORRECTION

PATENT NO. : 4,897,898
DATED : FEBRUARY 6, 1990
INVENTOR(S) : DAVID S. CHAPIN

It is certified that error appears in the above—identified patent and that said Letters Patent is hereby corrected as shown below:

On column 5, line 48: delete "3" and insert "30".

On column 5, line 66: delete "prevent" and insert "present".

Signed and Sealed this

Twelfth Day of May, 1992

*Attest:*

DOUGLAS B. COMER

*Attesting Officer*  Acting Commissioner of Patents and Trademarks